United States Patent
Choi et al.

(10) Patent No.: US 12,323,429 B2
(45) Date of Patent: Jun. 3, 2025

(54) MESSAGE SERVICE PROVIDING METHOD AND SERVER

(71) Applicant: SAMSUNG SDS CO., LTD., Seoul (KR)

(72) Inventors: Myoung Kyhun Choi, Seoul (KR); Han Eol Lee, Seoul (KR); Kyung Sun Kang, Seoul (KR); Yong Kook Park, Seoul (KR); Ki Man Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 105 days.

(21) Appl. No.: 18/218,329

(22) Filed: Jul. 5, 2023

(65) Prior Publication Data
US 2024/0098091 A1 Mar. 21, 2024

(30) Foreign Application Priority Data
Sep. 16, 2022 (KR) .................. 10-2022-0116908

(51) Int. Cl.
*H04L 9/40* (2022.01)
*H04L 51/21* (2022.01)

(52) U.S. Cl.
CPC ............ *H04L 63/102* (2013.01); *H04L 51/21* (2022.05)

(58) Field of Classification Search
CPC .............................. H04L 63/102; H04L 51/21
See application file for complete search history.

(56) References Cited

U.S. PATENT DOCUMENTS

| | | | | |
|---|---|---|---|---|
| 5,905,863 | A * | 5/1999 | Knowles | H04L 51/234 715/255 |
| 8,181,256 | B2 | 5/2012 | Hikichi et al. | |
| 9,021,249 | B2 * | 4/2015 | Jiang | H04W 12/084 455/410 |
| 9,660,832 | B2 * | 5/2017 | Koul | H04L 51/212 |
| 11,290,406 | B1 * | 3/2022 | Singh | H04L 51/216 |
| 2002/0138582 | A1 * | 9/2002 | Chandra | G06Q 10/107 709/206 |
| 2007/0016613 | A1 * | 1/2007 | Foresti | G06Q 10/107 |
| 2007/0282956 | A1 * | 12/2007 | Staats | H04L 51/216 709/206 |

(Continued)

FOREIGN PATENT DOCUMENTS

| | | |
|---|---|---|
| CN | 102056101 A | 5/2011 |
| KR | 10-2008-0063601 A | 7/2008 |

(Continued)

OTHER PUBLICATIONS

Search Report dated Feb. 2, 2024, issued by European Patent Office in European Patent Application No. 23190730.4.

*Primary Examiner* — Oleg Survillo
(74) *Attorney, Agent, or Firm* — Sughrue Mion, PLLC

(57) ABSTRACT

Provided is a method performed by a least one computing device for a message service. The method comprises receiving a transmission request for a compound message which is a bundled message comprising a parent message and a plurality of child messages, obtaining permission information for a sender of the compound message, determining whether to allow each of the child messages to be sent based on the permission information and controlling transmission of the compound message based on the determination result.

20 Claims, 11 Drawing Sheets

(56) References Cited

U.S. PATENT DOCUMENTS

| | | | |
|---|---|---|---|
| 2009/0327972 A1* | 12/2009 | McCann | G06F 16/24575 |
| | | | 707/E17.108 |
| 2011/0061099 A1* | 3/2011 | Jiang | H04W 12/086 |
| | | | 709/225 |
| 2012/0042019 A1* | 2/2012 | Koul | G06F 16/9535 |
| | | | 709/206 |
| 2013/0150101 A1* | 6/2013 | Bolouri | G06Q 10/10 |
| | | | 455/466 |
| 2014/0245178 A1* | 8/2014 | Smith | H04L 51/216 |
| | | | 715/753 |
| 2016/0036872 A1* | 2/2016 | Lappin | H04L 51/52 |
| | | | 709/204 |
| 2019/0317928 A1* | 10/2019 | Hirata | H04L 51/063 |
| 2019/0364502 A1* | 11/2019 | Agerstam | H04W 4/38 |
| 2020/0259772 A1 | 8/2020 | Dubie et al. | |
| 2021/0044551 A1 | 2/2021 | Cohen et al. | |
| 2021/0209530 A1* | 7/2021 | Gore | H04L 51/216 |
| 2021/0241887 A1* | 8/2021 | Nuthi | G06F 16/2272 |
| 2022/0224659 A1* | 7/2022 | El Ghazzal | G06N 20/00 |
| 2022/0385606 A1* | 12/2022 | Hassan | H04L 51/42 |
| 2022/0385607 A1* | 12/2022 | Hassan | H04L 51/04 |
| 2022/0385609 A1* | 12/2022 | Hassan | H04L 51/214 |
| 2022/0393996 A1* | 12/2022 | Siddiqui | H04L 51/216 |
| 2023/0412547 A1* | 12/2023 | Rathi | H04L 51/04 |

FOREIGN PATENT DOCUMENTS

| | | |
|---|---|---|
| KR | 10-0871619 B1 | 12/2008 |
| KR | 10-2016-0087640 A | 7/2016 |
| WO | 2005/109820 A1 | 11/2005 |

* cited by examiner

```
{
    "messageId" : 1234567890123456789,
    "messageType" : "MULTI",
    "senderId" : "SENDER@MESSAGE.SAMPLE",
    "childMessage" : [
        {
            "messageId" : 1234567890123456790,
            "messageType" : "TEXT",
            "message" : "Let me share party photo yesterday."
        },
        {
            "messageId" : 1234567890123456791,
            "messageType" : "FILE",
            "message" : "## FILE URL 1 ##"
        },
        {
            "messageId" : 1234567890123456792,
            "messageType" : "FILE",
            "message" : "## FILE URL 2 ##"
        },
        {
            "messageId" : 1234567890123456793,
            "messageType" : "FILE",
            "message" : "## FILE URL 3 ##"
        }
    ]
}
```

FIG. 4

| category | | | | message type | | content type | | |
|---|---|---|---|---|---|---|---|---|
| | | | | | | | file content | |
| affiliation | position | terminal | network | single | compound | text content | document content | photo content |
| ... | ... | fixed | internal | O | O | O | O | X |
| ... | ... | fixed | external | O | O | O | O | O |
| ... | ... | mobile | internal | O | O | O | X | X |
| ... | ... | mobile | external | O | O | O | O | O |

FIG. 7

MESSAGE SERVICE PROVIDING METHOD AND SERVER

This application claims the benefit of Korean Patent Application No. 10-2022-0116908, filed on Sep. 16, 2022, in the Korean Intellectual Property Office, the disclosure of which is incorporated herein in its entirety by reference.

BACKGROUND

1. Field

The present disclosure relates to a message service providing method and server, and more particularly, to a method of controlling message transmission according to a sender's permission when providing a message service and a message server performing the method.

2. Description of the Related Art

Most companies use message services to support smooth communication between members. For example, members of a company use an in-house messenger as one of their main communication channels.

In enterprise message services, a function of controlling message transmission according to a security policy established in a company is essentially required. This is because the scope of use of the enterprise message services has greatly expanded due to telecommuting and collaboration with partners, and the risk of leakage of company secrets has also increased significantly.

However, most enterprise message services only provide a control function to the extent of blocking transmission of a message with a file attached and do not provide a sophisticated transmission control function according to a sender's permission.

SUMMARY

Aspects of the present disclosure provide a method of performing sophisticated transmission control according to a sender's permission when providing a message service and a message server performing the method.

Aspects of the present disclosure also provide a method of performing sophisticated transmission control for a compound message according to a sender's permission and a message server performing the method.

Aspects of the present disclosure also provide the structure of a compound message designed to enable sophisticated transmission control.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for A message service providing may comprise receiving a transmission request for a compound message which may be a bundled message comprising a parent message and a plurality of child messages, obtaining permission information for a sender of the compound message, determining whether to allow each of the child messages to be sent based on the permission information, controlling transmission of the compound message based on the determination result.

In some embodiments, wherein the parent message may comprises only a metadata field, and each of the child messages may comprises a metadata field and a content field.

In some embodiments, wherein the determining of whether to allow each of the child messages to be sent may comprises primarily determining whether to allow the compound message to be sent based on metadata of the compound message and the permission information and secondarily determining whether to allow each of the child messages to be sent in response to the determination that the compound message is a message allowed to be sent.

In some embodiments, wherein the permission information may comprises information about terminals allowed to send messages, the metadata of the compound message comprises terminal information of the sender, and the primarily determining of whether to allow the compound message to be sent comprises determining whether to allow the compound message to be sent by comparing the information about the terminals may allowed to send messages with the terminal information of the sender.

In some embodiments, wherein the permission information may comprises information about a network where message transmission is allowed, the metadata of the compound message comprises information about a network where a terminal of the sender is located, and the primarily determining of whether to allow the compound message to be sent comprises determining whether to allow the compound message to be sent by comparing the information about the network where message transmission is allowed with the information about the network where the terminal of the sender may be located.

In some embodiments, wherein content of a predefined type or access information for the content is recorded in the content field of each of the child messages, type information of the content may be recorded in the metadata field of each of the child messages, the permission information comprises type information of content allowed to be sent, and the determining of whether to allow each of the child messages to be sent comprises determining whether to allow each of the child messages to be sent by comparing the type information of the content with the type information of the content may allowed to be sent.

In some embodiments, wherein if the content may be file content, the type of the content may be distinguished based on an extension of the file content.

In some embodiments, wherein the type of the content may allowed to be sent varies according to the terminal of the sender.

In some embodiments, wherein the type of the content allowed to be sent varies according to the network where the terminal of the sender may be located.

In some embodiments, wherein the type of the content may allowed to be sent varies according to the sender's affiliation or position.

In some embodiments, wherein the permission information may comprises information about keywords not allowed to be sent, and the determining of whether to allow each of the child messages to be sent comprises determining whether to allow each of the child messages to be sent based on whether the keywords not allowed to be sent may be included in content of each of the child messages.

In some embodiments, wherein the controlling of the transmission may comprises blocking the transmission of the compound message in response to the determination that a message not allowed to be sent exists among the child messages.

In some embodiments, wherein the controlling of the transmission may comprises reconstructing the compound message by excluding a message not allowed to be sent or replacing the message not allowed to be sent with a notification message informing of transmission blocking in response to the determination that the message may not allowed to be sent exists among the child messages; and sending the reconstructed compound message to a receiver of the compound message.

In some embodiments, wherein the controlling of the transmission may comprises masking a message not allowed to be sent in response to the determination that the message may not allowed to be sent exists among the child messages and sending the compound message may comprising the masked message to a receiver of the compound message.

According to an another aspect of the present disclosure, there may be provided server for an operation of receiving a transmission request for a compound message which is a bundled message comprising a parent message and a plurality of child messages, an operation of obtaining permission information for a sender of the compound message, an operation of determining whether to allow each of the child messages to be sent based on the permission information and an operation of controlling transmission of the compound message may based on the determination result.

In some embodiments, wherein content of a predefined type or access information for the content may be recorded in a content field of each of the child messages, type information of the content may be recorded in a metadata field of each of the child messages, the permission information may comprises type information of content may allowed to be sent, and the operation of determining whether to allow each of the child messages to be sent comprises an operation of determining whether to allow each of the child messages to be sent by comparing the type information of the content with the type information of the content may allowed to be sent.

In some embodiments, wherein the permission information comprises information about keywords may not allowed to be sent, and the operation of determining whether to allow each of the child messages to be sent may comprises an operation of determining whether to allow each of the child messages to be sent based on whether the keywords not allowed to be sent are included in content of each of the child messages.

In some embodiments, wherein the operation of controlling the transmission may comprises an operation of reconstructing the compound message by excluding a message not allowed to be sent or replacing the message may not allowed to be sent with a notification message informing of transmission blocking in response to the determination that the message may not allowed to be sent exists among the child messages and an operation of sending the reconstructed compound message to a receiver of the compound message.

In some embodiments, wherein the operation of controlling the transmission may comprises an operation of masking a message may not allowed to be sent in response to the determination that the message not allowed to be sent exists among the child messages and an operation of sending the compound message may comprising the masked message to a receiver of the compound message.

According to still another aspect of the present disclosure, there is provided a program for an operation of receiving a transmission request for a compound message which may be a bundled message comprising a parent message and a plurality of child messages, an operation of obtaining permission information for a sender of the compound message, an operation of determining whether to allow each of the child messages to be sent based on the permission information and an operation of controlling transmission of the compound message may based on the determination result.

BRIEF DESCRIPTION OF THE DRAWINGS

These and/or other aspects will become apparent and more readily appreciated from the following description of the embodiments, taken in conjunction with the accompanying drawings in which:

FIGS. 3 through 5 are example diagrams illustrating the structure and utilization example of a compound message according to embodiments of the present disclosure;

FIG. 7 is an example diagram illustrating a permission table or permission information according to embodiments of the present disclosure;

DETAILED DESCRIPTION

Figure 1:
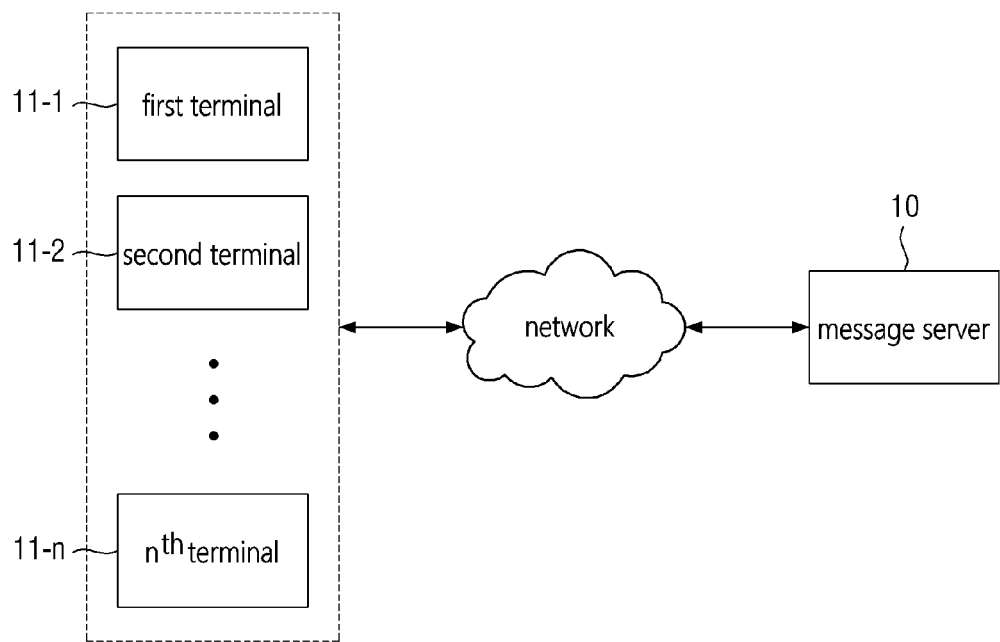
FIG. 1 is an example diagram illustrating a message service providing environment according to embodiments of the present disclosure.

FIG. 1 is an example diagram illustrating a message service providing environment according to embodiments of the present disclosure.

As illustrated in FIG. 1, a message server 10 providing a message service and a plurality of terminals 11-1 through 11-n using the message service may exist in the message service providing environment according to the embodiments. For ease of description, reference numeral '11' will hereinafter be used to refer to an arbitrary terminal 11-1 or 11-2 or . . . or 11-n or to collectively refer to all of the terminals 11-1 through 11-n.

The message server 10 may be a computing device/system that provides a message service. Here, the message service may be, for example, an instant message-based service, but the scope of the present disclosure is not limited thereto. For ease of understanding, the description will be continued below based on the assumption that the message service is an instance message-based service (e.g., a message service provided through a messenger).

The message server 10 may provide a message relay function between a message sender and a message receiver. For example, the message server 10 may receive a message transmission request from a sender's terminal (e.g., 11-1) and send a requested message to a receiver's terminal (e.g., 11-2).

In addition, the message server 10 may provide a transmission control function for a message based on permission (or authority) information of a message sender. Here, messages to be controlled may include a single message and a compound message. The compound message may refer to a bundled message including a parent message and a plurality of child messages. The structure and utilization example of the compound message will be described in detail with reference to FIGS. 3 through 5. In addition, the transmission control function for a message will be described in detail with reference to FIG. 6 and subsequent drawings.

The message server 10 may be implemented in at least one computing device. For example, all functions of the message server 10 may be implemented in one computing device, or a first function of the message server 10 may be implemented in a first computing device, and a second function may be implemented in a second computing device. Alternatively, a certain function of the message server 10 may be implemented in a plurality of computing devices.

Figure 11:
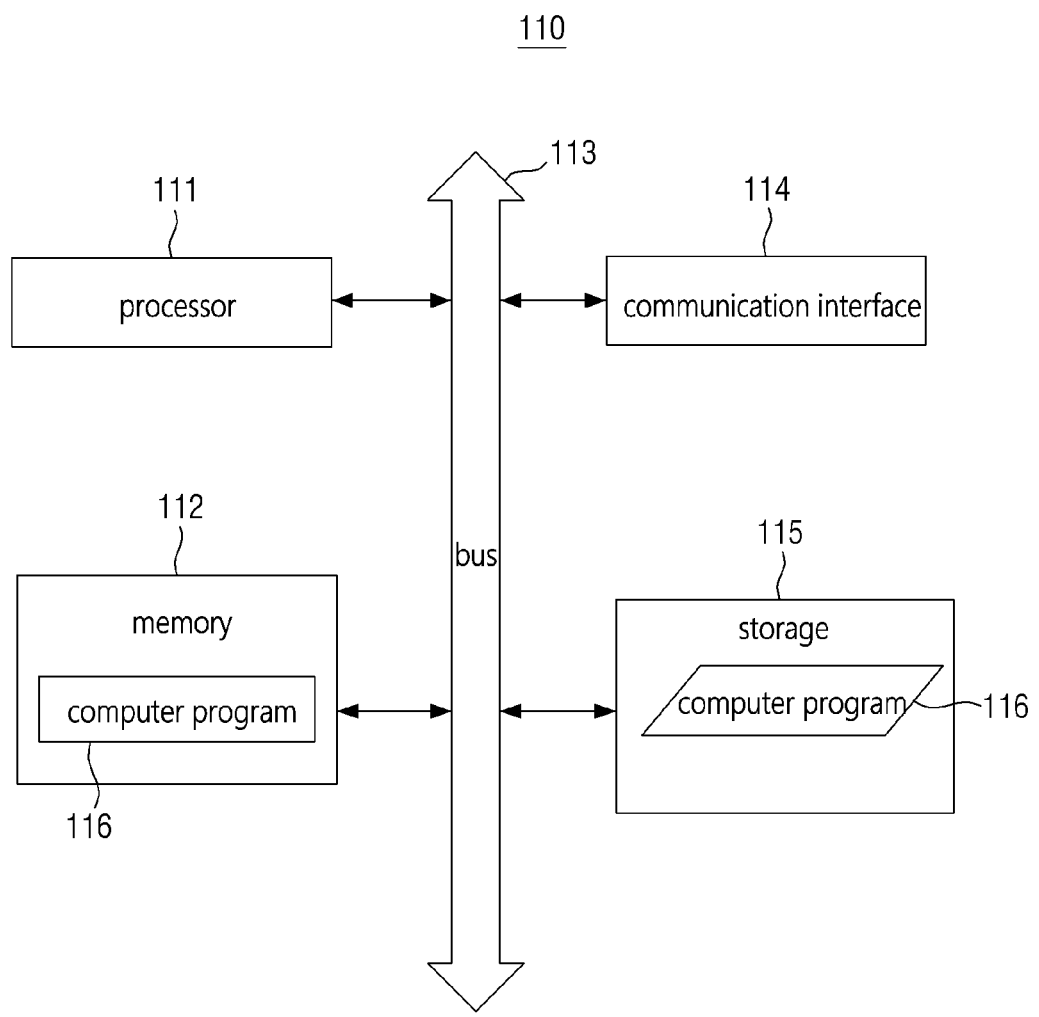
FIG. 11 illustrates an example computing device that can implement a message server or terminal according to embodiments of the present disclosure.

A computing device may be any device having computing and communicating functions, and an example of this device is illustrated in FIG. 11. Since the computing device is a collection of various components (e.g., a memory, a processor, etc.) interacting with each other, it may be named a 'computing system' in some cases. In addition, the computing system may refer to a collection of a plurality of computing devices interacting with each other.

Next, a terminal 11 may be a computing device of a user (e.g., a message sender or a message receiver) using a message service. For example, the user may use the message service after executing a message client (e.g., a message client application) installed in the terminal 11 and logging in. The message client may be an application implemented to allow the user to conveniently use the message service, but the scope of the present disclosure is not limited thereto. If the message service is provided based on the web, the message client may be a web browser.

The terminal 11 may be implemented as various computing devices such as mobile terminals (e.g., smartphones, tablets, laptops, notebooks, etc.) and fixed terminals (e.g., desktops, etc.). The terminal 11 can be implemented as any computing device. An example of such a computing device is illustrated in FIG. 11.

As illustrated in FIG. 1, the message server 10 and the terminal 11 may communicate through a network. Here, the network may be implemented as all types of wired/wireless networks such as a local area network (LAN), a wide area network (WAN), a mobile radio communication network, and wireless broadband Internet (Wibro).

Figure 2:
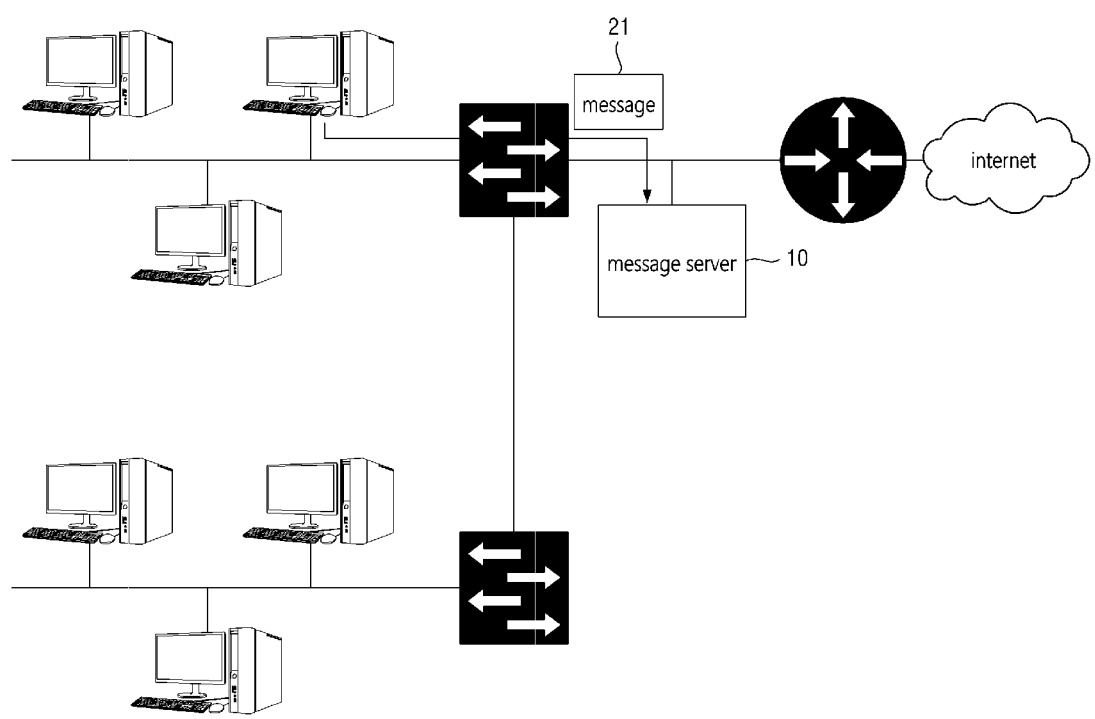
FIG. 2 is an example diagram for explaining advantages when a message service according to embodiments of the present disclosure is used in a company.

In some embodiments, as illustrated in FIG. 2, the message server 10 may be installed in an internal network (intranet) of a company to provide a message service (i.e., an enterprise message service) to members of the company. In this case, the message server 10 can provide a flexible and sophisticated transmission control function for a message 21 according to a security policy of the company. According to the current embodiments, since the message service having the transmission control function is used, security threats such as leakage of company secrets can be prevented in advance, and the level of security within the company can be greatly improved. In addition, communication restrictions between the members can be minimized, and work efficiency can be improved through the sophisticated transmission control of the message server 10. This will be described in detail later with reference to FIG. 6 and subsequent drawings.

Until now, the message service providing environment according to the embodiments of the present disclosure has been briefly described with reference to FIGS. 1 and 2. Hereinafter, a compound message according to embodiments of the present disclosure will be described with reference to FIGS. 3 through 5.

Figure 3:
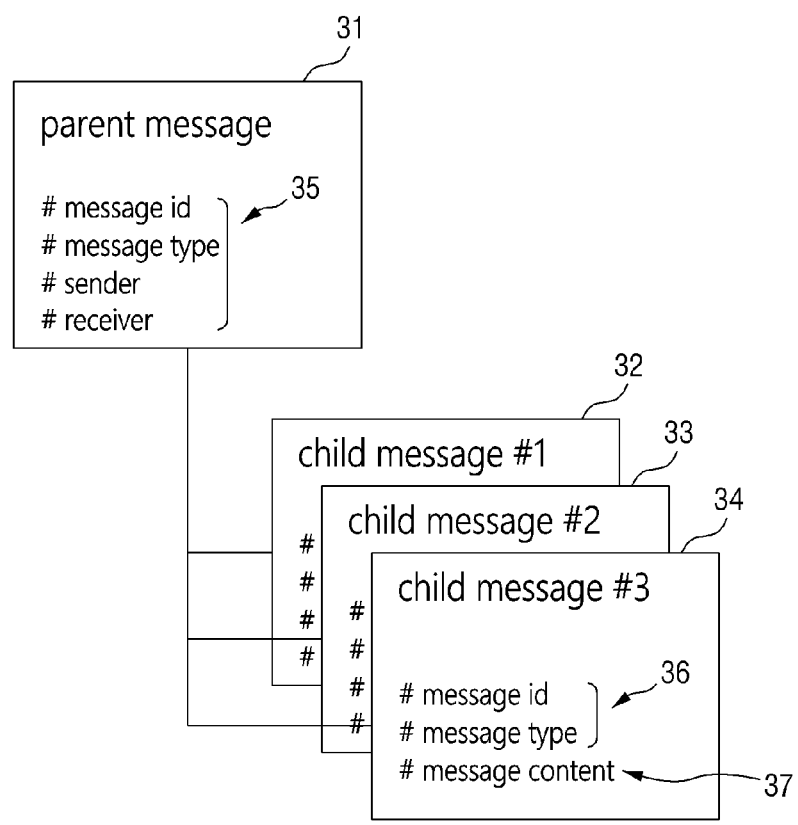

FIG. 3 is an example diagram illustrating the structure of a compound message according to embodiments of the present disclosure.

As illustrated in FIG. 3, the compound message according to the embodiments may be a kind of bundled message and may be composed of a parent message 31 and a plurality of child messages 32 through 34. In FIG. 3, the number of child messages 32 through 34 is 'three'. However, the number of child messages may vary. In some cases, a limit on the maximum number of child messages may be set. For ease of description, reference numeral '32' will hereinafter be used to refer to an arbitrary child message 32 or 33 or 34 or to collectively refer to all of the child messages 32 through 34.

The parent message 31 may refer to a message including metadata 35 representing the compound message. That is, the metadata representing the compound message may be recorded in a metadata field 35 of the parent message 31. In the metadata field 35 of the parent message 31, only a part of the metadata of the compound message may be recorded, or all of the metadata of the compound message may be recorded.

Examples of the metadata of the compound message may include information about message ID (i.e., representative ID of the compound message), message type, sender, receiver, channel, chat room, number of child messages, sender's terminal, network where sender's terminal is located, etc. However, the present disclosure is not limited thereto, and in some cases, some information may be excluded, or more information may be added.

The message type may be divided into a single message and a compound message, but the scope of the present disclosure is not limited thereto.

In addition, the sender information may be, for example, sender ID (e.g., message service account), affiliation, position, etc., but the scope of the present disclosure is not limited thereto.

In addition, the terminal information may be, for example, the type of terminal (e.g., mobile terminal, fixed terminal, etc.), terminal ID, terminal address, etc., but the scope of the present disclosure is not limited thereto.

In addition, the network information may be, for example, network type (e.g., internal network, external network), network ID, network address, etc., but the scope of the present disclosure is not limited thereto.

The parent message 31 may be a message including only the metadata field 35 as illustrated in the drawing or may be a message further including a content field, like the child messages 32. The metadata field 35 of the parent message 31 may be used to determine whether to allow the compound message itself (as a whole) to be sent. This will be described later (refer to the description of operation S63 in FIG. 6).

Next, a child message 32 may a sub-message of the parent message 31 and may refer to a message having a metadata field 36 and a content field 37. At least a part (e.g., information such as sender and receiver) of the metadata 35 of the parent message 31 may also be applied to the child message 32.

In the metadata field 36, for example, information such as message ID and type may be recorded. However, the scope of the present disclosure is not limited thereto. Here, the type of the child message 32 may refer to the type of content related to the content field 37. One child message 32 may be related to only one type of content, but the scope of the present disclosure is not limited thereto. The metadata field 36 may be used to determine whether to allow each child message 32 to be sent. This will be described later (refer to the description of operation S66 in FIG. 6).

The type of content may be divided into, for example, text content and file content, and the file content may be divided into, for example, photo content, document content and video content. In some cases, the type of the file content may be subdivided based on file extension. For example, the type of the document content may be subdivided according to an extension of a document file, and the type of the photo content may be subdivided according to an extension of a photo file. However, the scope of the present disclosure is not limited by these examples.

In the content field 37, content of a certain type, which is the content of a message, or access (or download) information for the content may be recorded. For example, text content may be recorded in the content field 37 as it is. In the case of file content, access information (e.g., URL, etc.) for the content may be recorded in the content field 37. This may be further understood from FIG. 4.

In some cases, the parent message 31 and the child message 32 may be referred to as a 'message' and a 'sub-message', respectively. Alternatively, since the parent message 31 can be regarded as serving as a container for a plurality of individual messages 32, the parent message 31 and the child message 32 may be referred to as a 'container message' and an 'individual message', respectively.

FIG. 4 is a representation of the structure of the compound message according to the embodiments of the present disclosure in a JavaScript Object Notation (JSON) format. In FIG. 4, a case where an ID of a child message is determined as a combination of an ID of a parent message and a sequence number (or index) is illustrated as an example.

In FIG. 4, 'MULTI' (or 'COMPOUND') means that the type of a corresponding message is a compound message.

Figure 5:
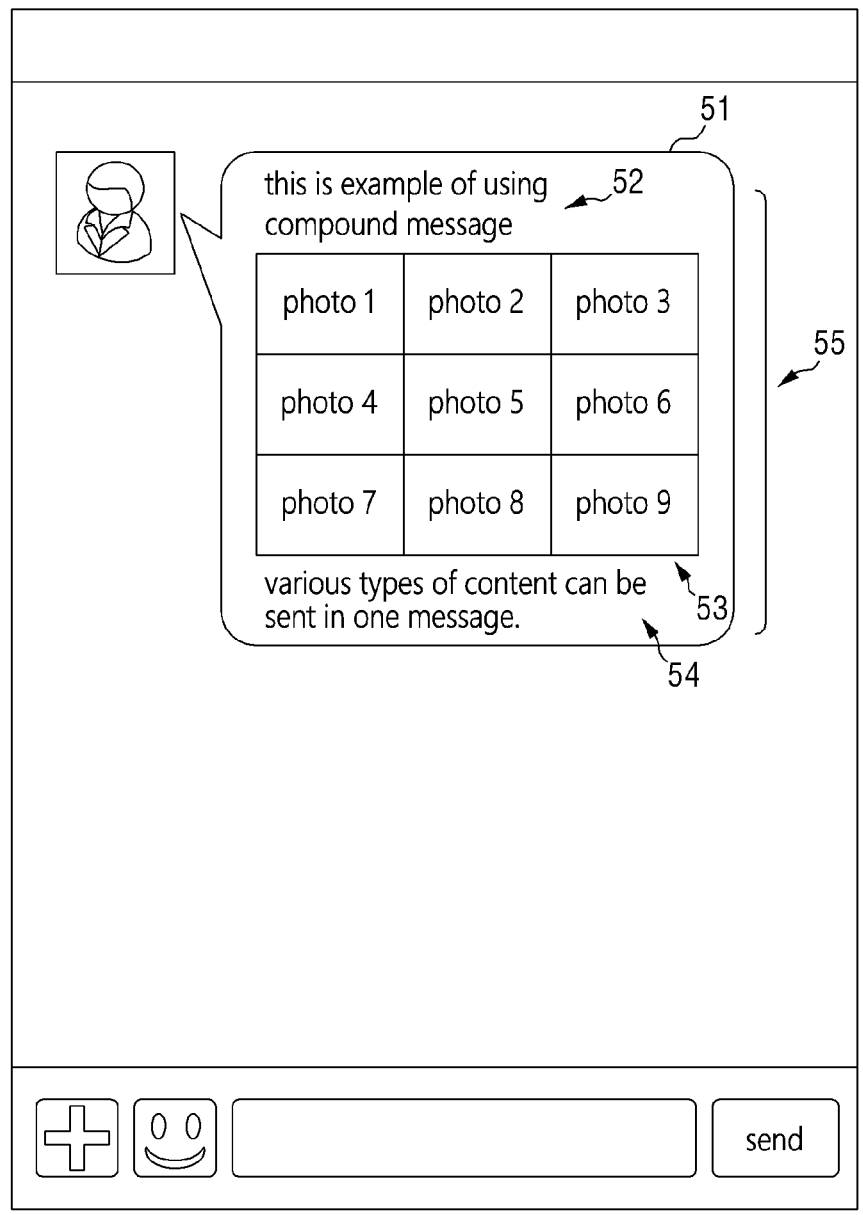

In FIG. 5, a compound message 55 is displayed in a message window (i.e., a message window of a receiver's terminal) according to embodiments of the present disclosure. In FIG. 5, a case where the compound message 55 is composed of a parent message, one child message 52 containing text content, nine child messages 53 containing photo content (i.e., photo file content), and one child message 54 containing text content is illustrated as an example. In addition, in FIG. 5, a case where the photo content is displayed in thumbnail form is illustrated as an example.

As illustrated in FIG. 5, the compound message 55 may be effective when a sender bundles different types of content and sends them to a receiver. As illustrated, one compound message 55 may be displayed in one speech bubble 51, but the scope of the present disclosure is not limited thereto.

Until now, the compound message according to the embodiments of the present disclosure has been described with reference to FIGS. 3 through 5. Hereinafter, a message service providing method according to embodiments of the present disclosure will be described with reference to FIG. 6 and subsequent drawings. For ease of understanding, the description will be continued based on the assumption that the method to be described later is performed in the environment illustrated in FIG. 2 (i.e., the enterprise environment). In addition, for more ease of understanding, the description will be continued based on the assumption that all operations of the method to be described later are performed by the message server 10. Therefore, when the subject of a specific step/operation is omitted, it may be understood that the step/operation is performed by the message server 10. However, some operations of the method to be described later may also be performed by a terminal 11 depending on the implementation method. For example, when a sender's permission information is stored in the sender's terminal (e.g., 11-1), transmission control for a message may be performed by a message client installed in the sender's terminal (e.g., 11-1) to reduce the load on the message server 10.

Figure 6:
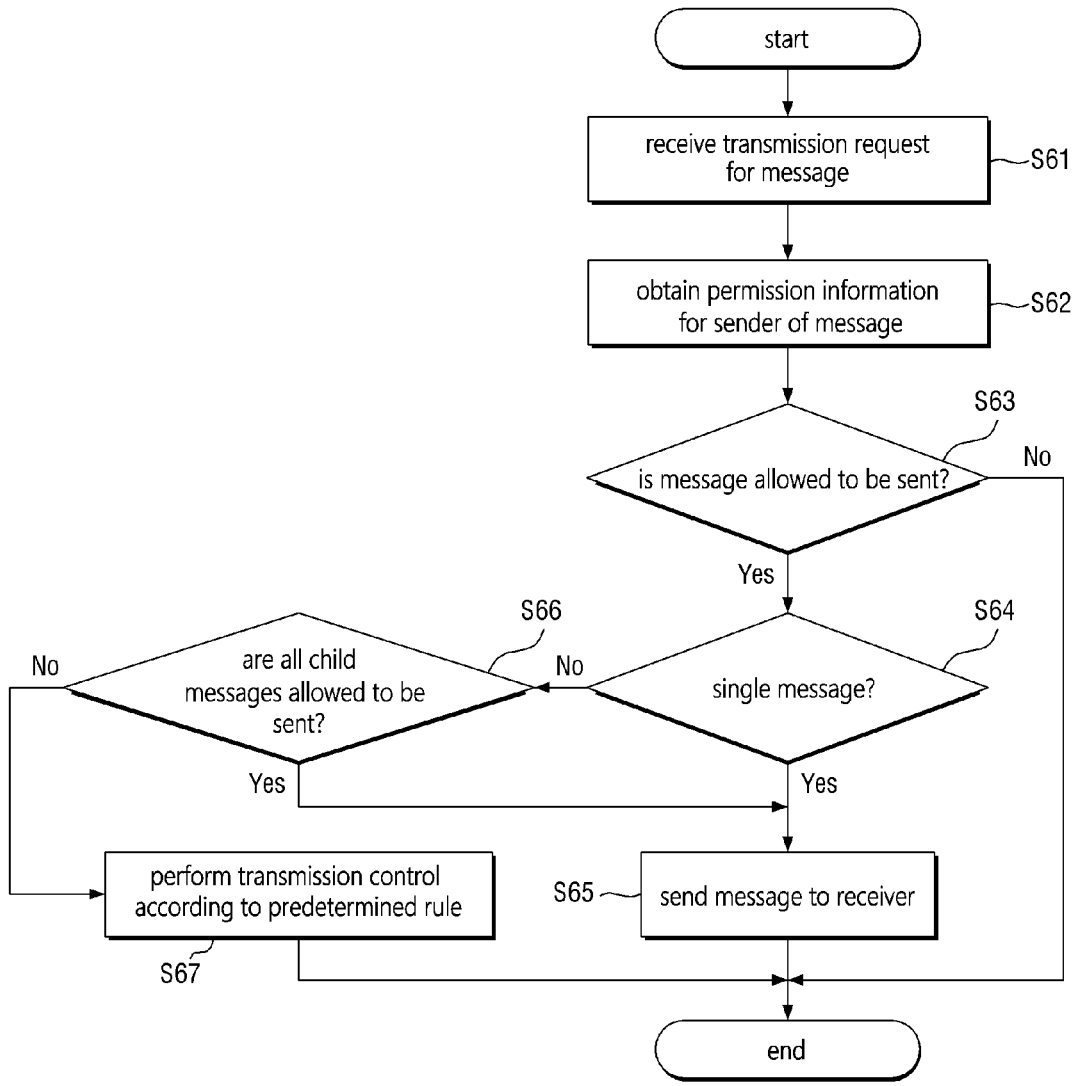
FIG. 6 is an example flowchart illustrating a message service providing method according to embodiments of the present disclosure.

FIG. 6 is an example diagram illustrating a message service providing method according to embodiments of the present disclosure. However, this is only an exemplary embodiment for achieving the objectives of the present disclosure, and some operations can be added or deleted as needed.

As illustrated in FIG. 6, the method according to the embodiments may start with operation S61 in which a transmission request for a message is received. For example, the message server 10 may receive a message from a sender's terminal (e.g., 11-1). Here, receiving the message may have substantially the same technical meaning as receiving a transmission request for the message.

In operation S62, permission information for the sender of the message may be obtained. For example, the message server 10 may obtain the permission information of the sender by searching a preset permission table (or database) using information about the sender of the requested message (e.g., sender information recorded in a metadata field of a parent message). Here, the permission table may be preset in consideration of, for example, a security policy of a company. Alternatively, the message server 10 may search for detailed information about the sender using the sender information (e.g., sender ID, etc.) included in the requested message and may obtain the permission information through a preset permission table using the found detailed information.

The detailed information about the sender may be, for example, the sender's ID (e.g., message service account), position/affiliation information (e.g., department, organization, company, another company, partner company, etc.), terminal information (e.g., terminal type, terminal ID, address, etc.), and information about a network where the sender's terminal is located (e.g., network type, network ID, network address, etc.), but the present disclosure is not limited thereto. For example, permission to send a message may be differentially set (that is, may vary) according to a user's position, affiliation, terminal, network, etc. In this case, the message server 10 may obtain the permission information for the sender using the detailed information about the sender, such as the sender's position and affiliation.

The permission information is information used to control message transmission (or verify the sender's permission) and may include information about various items that are allowed (i.e., with permission) or not allowed (i.e., without permission) to be sent.

For example, the permission information may include information about users who are allowed (or not allowed) to send messages and information about their position/affiliation (e.g., department, organization, company, another company, partner company, etc.). In this case, message transmission control can be easily performed for each user or position/affiliation. For example, transmission control, such as blocking message transmission of a sender belonging to a specific department, can be easily performed.

As another example, the permission information may include information about terminals (e.g., terminal type, terminal ID, address, etc.) which are allowed (or not allowed) to transmit messages. In this case, message transmission control can be easily performed for each terminal. For example, transmission control, such as blocking transmission of a requested message through a mobile terminal, can be easily performed.

As another example, the permission information may include information (e.g., network type, network ID, network address, etc.) about a network where message transmission is allowed (or not allowed) (a network where a sender's terminal and/or a receiver's terminal are located). In this case, message transmission control can be easily performed in consideration of the network where the sender's terminal and/or the receiver's terminal are located. For example, transmission control, such as blocking message transmission from an internal network to an external network, can be easily performed.

As another example, the permission information may include type information of messages (e.g., a single message and a compound message) which are allowed (or not allowed) to be sent. In this case, transmission control can be easily performed for each type of message. For example, transmission control, such as blocking transmission of a compound message only for some users, can be easily performed.

As another example, the permission information may include type information of content for which message transmission is allowed (or not allowed). In this case, transmission control can be easily performed for each type of content. For example, transmission control, such as blocking transmission of a message containing a specific type of content only for some users, can be easily performed.

As another example, the permission information may include information about keywords for which message transmission is not allowed. In this case, since even keywords included in the content of messages are considered, message transmission control can be performed in a more sophisticated manner. For example, sophisticated transmission control, such as blocking transmission of a message containing a specific keyword, can be easily performed.

As another example, the permission information may include information based on a combination of various examples described above. For example, the permission information may include keywords that are not allowed to be sent and type information of content that is allowed to be sent.

In the various examples described above, a sender's permission for a message may be set differentially according to the sender (i.e., user), the sender's position/affiliation, the sender's terminal, or a network where the sender's terminal and/or a receiver's terminal are located. For example, as illustrated in FIG. 7, the type of message and content which are allowed to be sent may vary according to affiliation, position, terminal type, network type, etc. In this case, message transmission control can be performed in a fairly flexible and sophisticated manner. For example, transmission control, such as blocking transmission of a message containing document content and photo content only when the sender sends a message (e.g., sends a message to the outside) using a mobile terminal connected to an internal network, can be easily performed. As another example, transmission control, such as blocking transmission of a message containing file content only when the sender does not belong to a corresponding company (e.g., belongs to a partner company or another company), can be easily performed.

Referring back to FIG. 6, in operation S63, whether to allow transmission of the requested message may be primarily determined based on the obtained permission information of the sender. This operation may be understood as an operation of determining whether to allow transmission of the requested message itself (or as a whole). In the current operation, the message server 10 may determine whether the requested message is a message allowed to be sent by using metadata of the requested message and the permission information of the sender.

For example, assume that the permission information includes information about terminals allowed to send messages and that the metadata of the requested message includes information about the sender's terminal. In this case, the message server 10 may determine whether to allow transmission of the requested message by comparing the information about the terminals allowed to send messages with the information about the sender's terminal.

As another example, assume that the permission information includes information about a network where message transmission is allowed and that the metadata of the requested message includes information about a network where the sender's terminal and/or a receiver's terminal are located. In this case, the message server 10 may determine whether to allow transmission of the requested message by comparing the information about the network where message transmission is allowed with the information about the network where the sender's terminal is located.

As another example, assume that the permission information includes information about the type of message allowed to be sent and that the metadata of the requested message includes type information. In this case, the message server 10 may determine whether to allow transmission of the requested message by comparing the information about the type of message allowed to be sent with the type information of the requested message.

In some embodiments, when determining that the requested message is a message not allowed to be sent, the message server 10 may send a notification message informing that transmission of the requested message has been blocked to the terminal of the sender and/or the receiver.

In operation S64, it may be determined whether the type of the requested message is a single message. In response to the determination that the type of the requested message is a single message, operation S65 may be performed. In the opposite case (i.e., when the type of the requested message is a compound message), operation S66 may be performed.

For reference, even when the requested message is a single message, it may be determined whether the content of the message (e.g., content type, etc.) is allowed to be sent, and appropriate transmission control may be performed based on the determination result. This may be understood from the description of operations S66 and S67.

In operation S65, the requested message may be sent to a receiver of the message (e.g., the receiver's terminal or account).

In operation S66, in response to the determination that the type of the requested message is a compound message, it may be determined whether to allow transmission of each child message. For example, the message server 10 may compare the permission information with metadata (or content) of each child message to determine whether to allow transmission of each child message. As a result, operation S65 may be performed when all child messages are messages allowed to be sent, and operation S67 may be performed in the opposite case (i.e., when there is a message not allowed to be sent among the child messages).

For example, assume that the permission information includes information about the type of content allowed to be sent and that type information of content is recorded in a metadata field of each child message. In this case, the message server 10 may determine whether to allow transmission of each child message by comparing the information about the type of content allowed to be sent with the type information recorded in the metadata field.

As another example, assume that the permission information includes information about keywords not allowed to be sent. In this case, the message server 10 may check whether the content of each child message (e.g., text content, document content, etc.) includes keywords that are not allowed to be sent and may determine whether to allow transmission of each child message based on the checking result. If the content of a child message is photo or video content, the message server 10 may extract text related to the content by using text recognition, voice recognition, image captioning (e.g., image captioning using a deep learning model) or scene recognition and may check whether the extracted text includes keywords that are not allowed to be sent.

For reference, if a content field exists in the parent message, whether to allow transmission of the parent message may also be determined in operation S66 or in another operation.

In operation S67, transmission control for the requested message (i.e., compound message) may be performed according to a predetermined rule. That is, in response to the determination that there is a message not allowed to be sent among the child messages, transmission control may be performed for the requested compound message. However, a specific control method may vary depending on embodiments.

In some embodiments, transmission of the requested compound message may be blocked. For example, even when only some of the child messages are messages not allowed to be sent, the message server 10 may block transmission of the entire compound message. In this case, the message server 10 may send a notification message informing that transmission of the requested compound message has been blocked to the terminal of the sender and/or the receiver.

Figure 8:
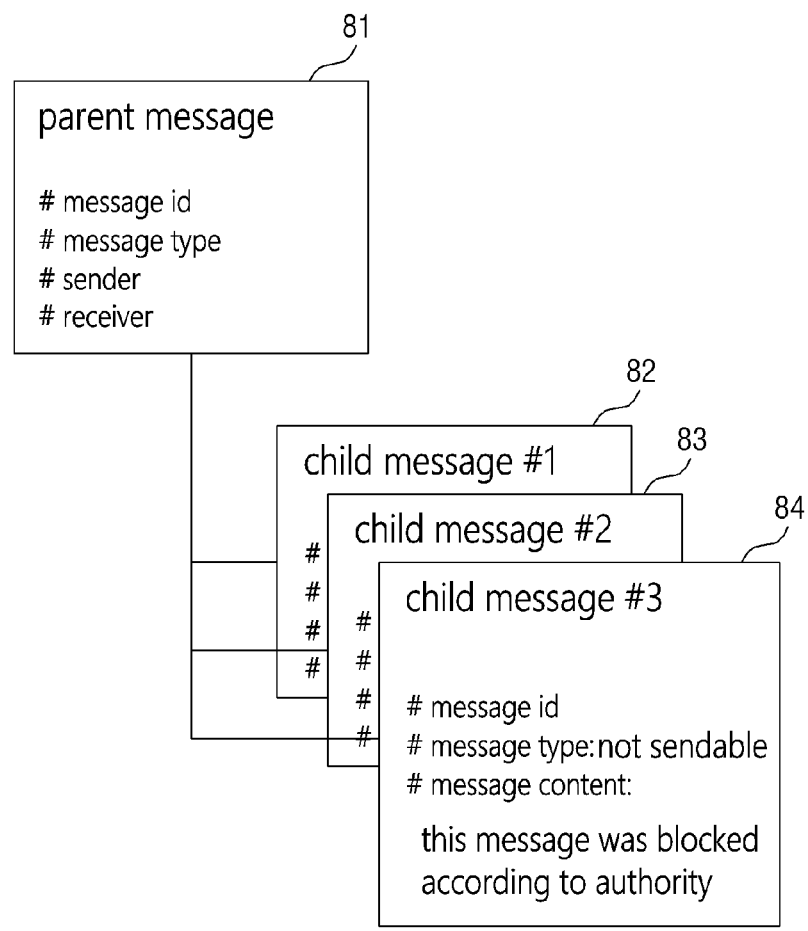
FIG. 8 is an example diagram for explaining a method of controlling transmission of a compound message according to embodiments of the present disclosure.

In some embodiments, the compound message may be reconstructed by excluding a message not allowed to be sent from the child messages or replacing the message not allowed to be sent with a notification message informing of transmission blocking. Then, the reconstructed compound message may be sent to the receiver. For example, assume that one of two child messages is determined to be a message not allowed to be sent. In this case, the message server 10 may reconstruct the compound message to include only the parent message and the remaining one child message and may send the reconstructed compound message to the receiver. As another example, as illustrated in FIG. 8, the message server 10 may reconstruct the compound message by replacing a message not allowed to be sent among the child messages (e.g., 82 and 83) with a notification message 84 informing of transmission blocking and may send the reconstructed compound message to the receiver. In FIG. 8, a case where a compound message is composed of a parent message 81 and three child messages (e.g., 82 and 83) is illustrated as an example. In some cases, the message server 10 may reconstruct the compound message by deleting, masking, or replacing the content of a message not allowed to be sent among the child messages with a predetermined phrase (e.g., a blocking notification phrase as illustrated in FIG. 8).

Figure 9:
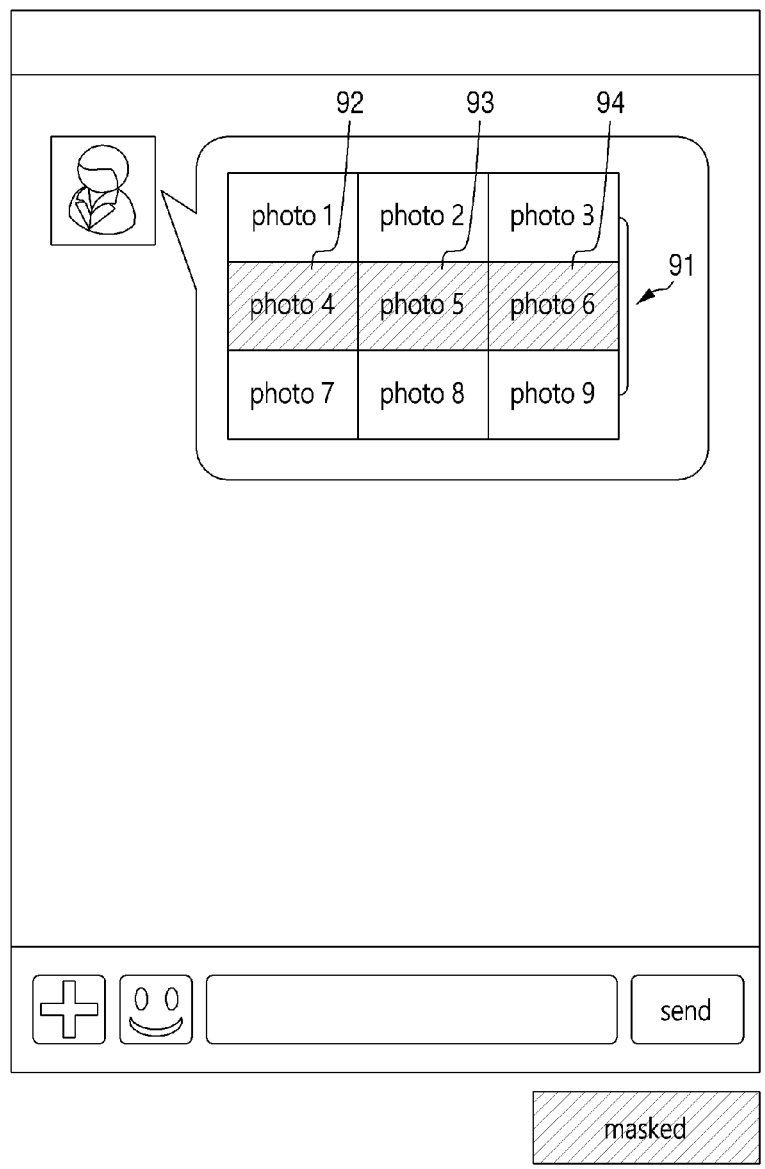
FIG. 9 is an example diagram for explaining a method of controlling transmission of a compound message according to embodiments of the present disclosure.

In some embodiments, only a message not allowed to be sent among the child messages may be masked, and the compound message including the masked message may be sent to the receiver. For example, as illustrated in FIG. 9, assume that a compound message 91 includes nine child messages related to photo content (e.g., 92 through 94) and that three child messages 92 through 94 are determined to be messages not allowed to be sent (e.g., photo files with extensions that are not allowed to be sent). In this case, the message server 10 may mask only the messages not allowed to be sent (e.g., replace the photo files with masked files) and send the compound message 91 including the masked messages to the receiver. Any masking method can be used as long as the masked messages are not displayed on the receiver's terminal. For example, in some cases, the message server 10 may provide information about only a specific part of a child message or content to be masked, and a message client installed in the receiver's terminal may perform masking based on the information.

In some embodiments, transmission control for the compound message may be performed based on various combinations of the above-described embodiments. For example, the message server 10 may block transmission of the entire compound message or block transmission of only a message not allowed to be sent among the child messages (e.g., replace the message not allowed to be sent with a notification message informing of transmission blocking or mask the message not allowed to be sent) according to detailed information about the sender (e.g., affiliation, position, terminal, network, etc.), message type, content type, etc. (e.g., if the content type is photo content, masking is performed. If the content type is text content, the message not allowed to be sent is deleted or replaced with a blocking notification message. If a message is sent through a mobile terminal or if a user who does not belong to a corresponding company sends a message through a mobile terminal, the entire compound message is blocked).

According to some embodiments of the present disclosure, the content of the parent message (e.g., text to be recorded in the content field) may be automatically generated before the compound message is sent to the receiver. For example, the message server 10 may automatically generate the content of the parent message based on the result of analyzing the child messages. The current embodiments will be described in more detail a little later with reference to FIG. 10.

Until now, the message service providing method according to the embodiments of the present disclosure has been described with reference to FIGS. 6 through 9. According to the above-described method, it is possible to provide a message service with enhanced security by appropriately controlling message transmission based on a sender's permission information. In addition, when such a message service is applied to a company, security threats such as leakage of company secrets to the outside can be effectively prevented.

In addition, transmission control for a message can be performed in a sophisticated and flexible manner by differentially setting permission for message transmission according to various factors such as the sender's affiliation, position, terminal, and network.

In addition, sophisticated transmission control for a compound message can be performed by performing transmission control for each of a plurality of child messages constituting the compound message. For example, transmission control, such as blocking transmission of only some child messages without permission (i.e., messages not allowed to be sent) among the child messages, can be easily performed.

Figure 10:
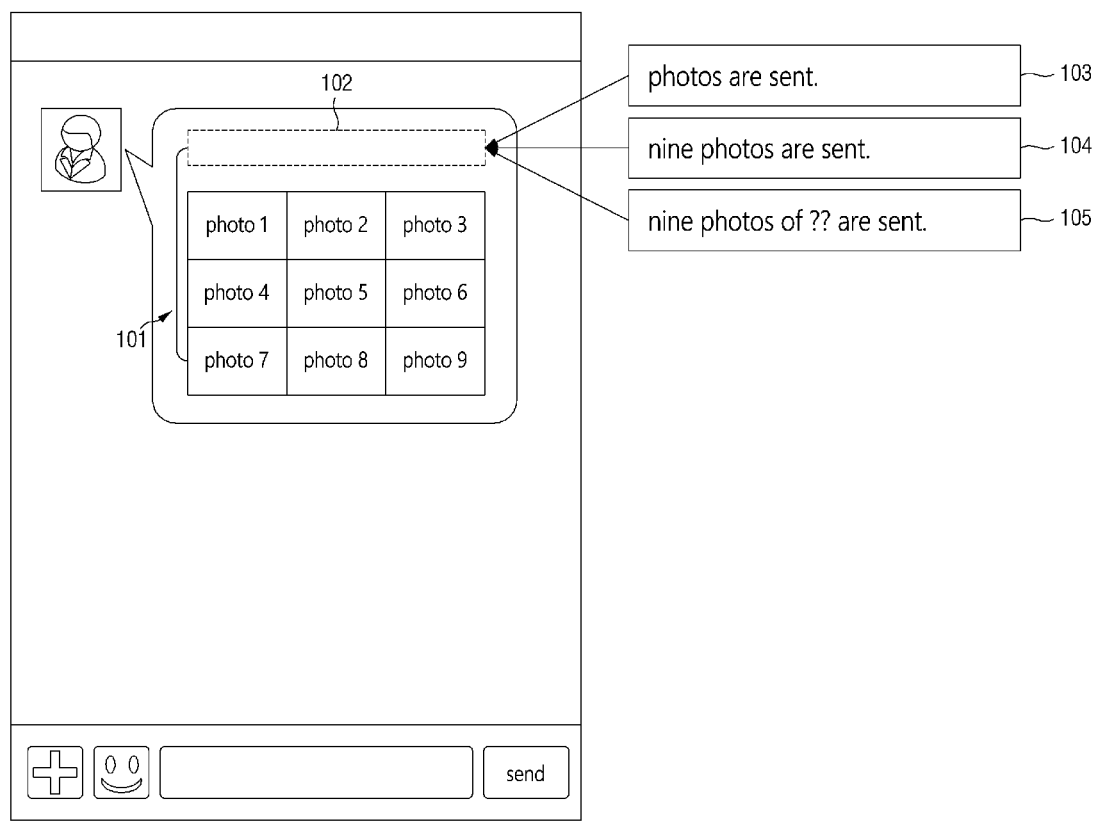
FIG. 10 is an example diagram for explaining a method of automatically generating a parent message according to embodiments of the present disclosure.

Hereinafter, a method of automatically generating the content of a parent message according to embodiments of the present disclosure will be described with reference to FIG. 10. FIG. 10 illustrates a case where a compound message 101 is composed of nine child messages related to photo content as an example.

As illustrated in FIG. 10, the message server 10 may automatically generate content 102 of a parent message constituting the compound message 101 based on the result of analyzing the child messages. The example illustrated in FIG. 10 can also be understood as generating a new child message 102 based on the result of analyzing the existing child messages by using the message server 10.

In the current embodiments, the result of analyzing the child messages may include all types of information that can be derived by analyzing metadata and content of the child messages, and any analysis method can be used. For example, the message server 10 may analyze and derive information about the number of child messages, the type of content included in the child messages, the topic of content, and the sentiment of text content. However, the scope of the present disclosure is not limited thereto.

As a specific example, the message server 10 may derive topic information and sentiment information by inputting text content of the child messages to a topic classification model (e.g., a trained topic classification model) or a sentiment classification model.

As another example, when the content of the child messages is photo or video content, the message server 10 may extract text related to the content by using text recognition, voice recognition, image captioning (e.g., image captioning using a deep learning model), scene recognition, etc. and may derive topic information and sentiment information by inputting the extracted text to a topic classification model or a sentiment classification model.

Next, the message server 10 may automatically generate the content 102 of the parent message by variously combining information included in the analysis result. For example, as illustrated in the drawing, the message server 10 may generate a specific text 103 (e.g., an explanatory text for the compound message 101) using type information of the child messages, may generate a specific text 104 using information about the number and type of the child messages, or may generate a specific text 105 using information about the number, type, and topic of the child messages. In some cases, the message server 10 may add an emoticon or change a dialogic style or font of the generated text (e.g., 103) by using the sentiment information of the child messages.

According to some embodiments of the present disclosure, the content 102 of the parent message and/or the automatically generated text (e.g., 103) may be displayed in a message window of the receiver' terminal such that they are distinguished from other messages (e.g., by changing visual elements such as font, background color, text color, text size, thickness, etc.).

Until now, the method of automatically generating the content of the parent message according to the embodiments of the present disclosure has been described with reference to FIG. 10. According to the above-described method, since the content of a parent message (e.g., an explanatory text for a compound message) is automatically generated based on the result of analyzing child messages, the convenience of users using a message server can be greatly improved.

According to embodiments of the present disclosure, it is possible to provide a message service with enhanced security by appropriately controlling message transmission based on a sender's permission information. In addition, when such a message service is applied to a company, security threats such as leakage of company secrets to the outside can be effectively prevented.

In addition, transmission control for a message can be performed in a sophisticated and flexible manner by differentially setting permission for message transmission according to various criteria such as the sender's affiliation, position, terminal, and network.

In addition, the sender's permission information may include type information of messages allowed to be sent. In this case, transmission control can be easily performed for each type of message. For example, transmission control, such as blocking transmission of a compound message only for some users, can be easily performed.

In addition, the sender's permission information may include type information of content allowed to be sent. In this case, transmission control can be easily performed for each type of content included in a message. For example, transmission control, such as blocking transmission of a message containing a specific type of content (e.g., document content, photo content, etc.) only for some users, can be easily performed.

In addition, it is possible to perform transmission control for a compound message in a sophisticated and easy manner by performing transmission control for each of a plurality of child messages constituting the compound message. For example, transmission control, such as blocking transmission of only some child messages without permission (i.e., messages not allowed to be sent) among the child messages, can be easily performed. Accordingly, communication restrictions between members using a message service can be minimized.

However, the effects of the present disclosure are not restricted to the one set forth herein. The above and other effects of the present disclosure will become more apparent to one of daily skill in the art to which the present disclosure pertains by referencing the claims.

What is claimed is:

1. A message service providing method performed by at least one computing device, the method comprising:
receiving a transmission request for a compound message, which is a bundled message comprising a parent message and a plurality of child messages, the bundled message being generated by bundling the plurality of child messages by a sender to be sent to a receiver, wherein the parent message serves as a container for the plurality of child messages, and information of the sender and the receiver is included in a metadata field of the parent message and not included in a metadata field of each of the plurality of child messages;
obtaining permission information for the sender of the compound message using the information of the sender included in the metadata field of the parent message;
determining whether to allow each of the plurality of child messages to be sent based on the permission information; and
controlling transmission of the compound message based on the determination result,
wherein the information of the sender and the receiver included in the metadata field of the parent message is applied to each of the plurality of child messages.

2. The method of claim 1, wherein the parent message comprises only the metadata field and does not have a content field, and each of the plurality of child messages comprises the metadata field and a content field.

3. The method of claim 1, wherein the determining of whether to allow each of the plurality of child messages to be sent comprises:
primarily determining whether to allow the compound message to be sent based on metadata of the compound message and the permission information; and
secondarily determining whether to allow each of the plurality of child messages to be sent in response to the determination that the compound message is a message allowed to be sent.

4. The method of claim 3, wherein the permission information comprises information about terminals allowed to send messages, the metadata of the compound message comprises terminal information of the sender, and the primarily determining of whether to allow the compound message to be sent comprises determining whether to allow the compound message to be sent by comparing the information about the terminals allowed to send messages with the terminal information of the sender.

5. The method of claim 3, wherein the permission information comprises information about a network where message transmission is allowed, the metadata of the compound message comprises information about a network where a terminal of the sender is located, and the primarily determining of whether to allow the compound message to be sent comprises determining whether to allow the compound message to be sent by comparing the information about the network where message transmission is allowed with the information about the network where the terminal of the sender is located.

6. The method of claim 1, wherein content of a predefined type or access information for the content is recorded in a content field of each of the plurality of child messages, type information of the content is recorded in the metadata field of each of the plurality of child messages, the permission information comprises type information of content allowed to be sent, and the determining of whether to allow each of the plurality of child messages to be sent comprises determining whether to allow each of the plurality of child messages to be sent by comparing the type information of the content with the type information of the content allowed to be sent.

7. The method of claim 6, wherein if the content is file content, a type of the content is distinguished based on an extension of the file content.

8. The method of claim 6, wherein a type of the content allowed to be sent varies according to a terminal of the sender.

9. The method of claim 6, wherein a type of the content allowed to be sent varies according to a network where a terminal of the sender is located.

10. The method of claim 6, wherein a type of the content allowed to be sent varies according to the sender's affiliation or position.

11. The method of claim 1, wherein the permission information comprises information about keywords not allowed to be sent, and the determining of whether to allow each of the plurality of child messages to be sent comprises determining whether to allow each of the plurality of child messages to be sent based on whether the keywords not allowed to be sent are included in content of each of the plurality of child messages.

12. The method of claim 1, wherein the controlling of the transmission comprises blocking the transmission of the compound message in response to the determination that a message not allowed to be sent exists among the plurality of child messages.

13. The method of claim 1, wherein the controlling of the transmission comprises:
reconstructing the compound message by excluding a message not allowed to be sent or replacing the message not allowed to be sent with a notification message informing of transmission blocking in response to the determination that the message not allowed to be sent exists among the plurality of child messages; and
sending the reconstructed compound message to the receiver of the compound message.

14. The method of claim 1, wherein the controlling of the transmission comprises:
masking a message not allowed to be sent in response to the determination that the message not allowed to be sent exists among the plurality of child messages; and
sending the compound message comprising the masked message to the receiver of the compound message.

15. A message server comprising:
one or more processors;
a memory storing one or more instructions; and
a communication interface,
wherein the one or more processors execute the stored one or more instructions to perform:
an operation of receiving a transmission request for a compound message which is a bundled message comprising a parent message and a plurality of child messages, the bundled message being generated by bundling the plurality of child messages by a sender to be sent to a receiver, wherein the parent message serves as a container for the plurality of child messages, and information of the sender and the receiver is included in a metadata field of the parent message and not included in a metadata field of each of the plurality of child messages;
an operation of obtaining permission information for the sender of the compound message using the information of the sender included in the metadata field of the parent message;
an operation of determining whether to allow each of the plurality of child messages to be sent based on the permission information; and
an operation of controlling transmission of the compound message based on the determination result,
wherein the information of the sender and the receiver included in the metadata field of the parent message is applied to each of the plurality of child messages.

16. The message server of claim 15, wherein content of a predefined type or access information for the content is recorded in a content field of each of the plurality of child messages, type information of the content is recorded in the metadata field of each of the plurality of child messages, the permission information comprises type information of content allowed to be sent, and the operation of determining whether to allow each of the plurality of child messages to be sent comprises an operation of determining whether to allow each of the plurality of child messages to be sent by comparing the type information of the content with the type information of the content allowed to be sent.

17. The message server of claim 15, wherein the permission information comprises information about keywords not allowed to be sent, and the operation of determining whether to allow each of the plurality of child messages to be sent comprises an operation of determining whether to allow each of the plurality of child messages to be sent based on whether the keywords not allowed to be sent are included in content of each of the plurality of child messages.

18. The message server of claim 15, wherein the operation of controlling the transmission comprises:
   an operation of reconstructing the compound message by excluding a message not allowed to be sent or replacing the message not allowed to be sent with a notification message informing of transmission blocking in response to the determination that the message not allowed to be sent exists among the plurality of child messages; and
   an operation of sending the reconstructed compound message to the receiver of the compound message.

19. The message server of claim 15, wherein the operation of controlling the transmission comprises:
   an operation of masking a message not allowed to be sent in response to the determination that the message not allowed to be sent exists among the plurality of child messages; and
   an operation of sending the compound message comprising the masked message to the receiver of the compound message.

20. A computer-readable recording medium storing a computer program executable by at least one processor to execute:
   an operation of receiving a transmission request for a compound message which is a bundled message comprising a parent message and a plurality of child messages, the bundled message being generated by bundling the plurality of child messages by a sender to be sent to a receiver, wherein the parent message serves as a container for the plurality of child messages, and information of the sender and the receiver is included in a metadata field of the parent message and not included in a metadata field of each of the plurality of child messages;
   an operation of obtaining permission information for the sender of the compound message using the information of the sender included in the metadata field of the parent message;
   an operation of determining whether to allow each of the plurality of child messages to be sent based on the permission information; and
   an operation of controlling transmission of the compound message based on the determination result,
   wherein the information of the sender and the receiver included in the metadata field of the parent message is applied to each of the plurality of child messages.

* * * * *